United States Patent [19]

Turner

[11] Patent Number: 5,000,368

[45] Date of Patent: Mar. 19, 1991

[54] METHOD FOR CLADDING THE ENDS OF A PRE-CLAD TUBULAR PRODUCT IN PREPARATION FOR THREADING

[76] Inventor: William C. Turner, 85 Pinto La., Sedona, Ariz. 86336

[21] Appl. No.: 920,593

[22] Filed: Oct. 20, 1986

Related U.S. Application Data

[63] Continuation-in-part of Ser. No. 694,347, Jan. 25, 1985, Pat. No. 4,620,660.

[51] Int. Cl.⁵ ............................................... B23K 1/00
[52] U.S. Cl. .................................... 228/131; 228/127; 228/132; 228/134
[58] Field of Search .............. 228/127, 186, 132, 158, 228/265, 219, 221, 153, 131

[56] References Cited

U.S. PATENT DOCUMENTS

| | | | |
|---|---|---|---|
| 2,508,465 | 5/1950 | Offinger | 228/132 |
| 2,508,466 | 5/1950 | Brace | 228/134 |
| 2,616,481 | 11/1952 | Twells | 228/134 |
| 3,050,613 | 8/1962 | Sheinhartz | 228/127 |
| 3,101,531 | 8/1963 | Roseberry | 228/132 |
| 3,408,728 | 11/1968 | Fickett | 228/133 |
| 3,481,024 | 12/1969 | Bunn | 228/131 |
| 3,762,032 | 10/1973 | Bowling | 228/127 |
| 3,963,162 | 6/1976 | Taguchi | 228/134 |
| 4,533,806 | 8/1985 | Kawasaki | 228/131 |

Primary Examiner—Kurt Rowan
Attorney, Agent, or Firm—Head & Johnson

[57] ABSTRACT

A method of cladding the ends of a length of previously clad pipe with a clad of greater thickness than the clad for the balance of the length in order to allow for threading, including the steps of boring, facing and turning the end of the pipe, plating by electroless deposition the faying surfaces of a nickel-base alloy cladding cylinder, assembling the cylinder to the length of pipe, assembling a close fitting tooling mandrel on the inside of the cladding cylinders, the tooling mandrel being made of a metal possessing a higher coefficient of thermal expansion than does the pipe, placing the subassembly within a housing having an induction coil therein, evacuating the housing atmosphere and back filling with an inert gas such as argon, heating the subassembly to about 1650° to 2100° F., thereby melting the nickel base alloy and expanding the mandrel diameter more than the subassembly diameter to obtain necessary pressure to eliminate fit-up gaps thereby metallically bonding the cladding member to the end of the pipe by means of the mechanism of liquid interface diffusion bonding.

11 Claims, 2 Drawing Sheets

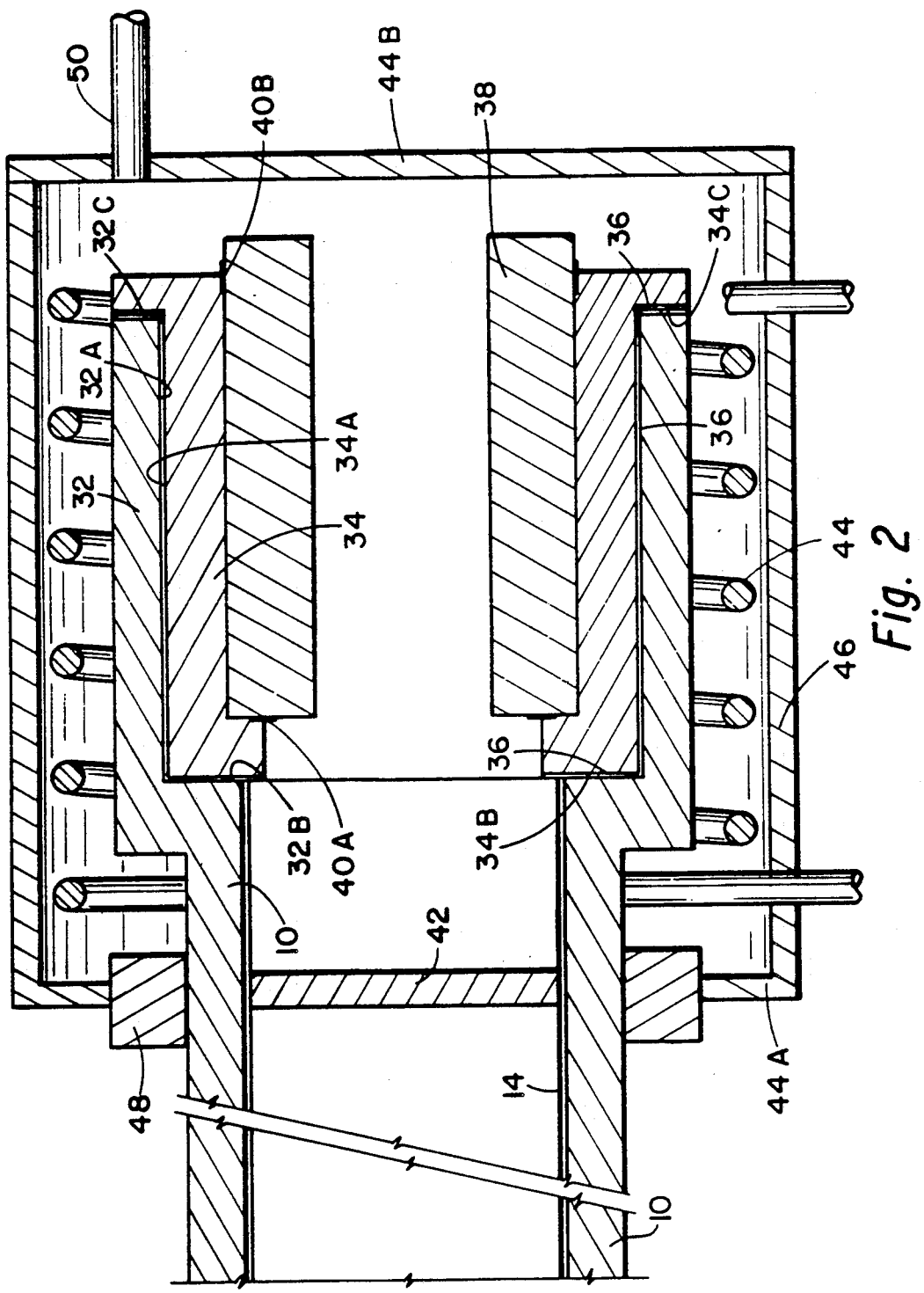

METHOD FOR CLADDING THE ENDS OF A PRE-CLAD TUBULAR PRODUCT IN PREPARATION FOR THREADING

CROSS-REFERENCE TO RELATED APPLICATION

This is a continuation-in-part of application No. 694,347 filed Jan. 25, 1985 entitled: "Method of Manufacturing An Internally Clad Tubular Product," now U.S. Pat. No. 4,620,660.

SUMMARY OF THE INVENTION

A need exists for down hole clad tubulars that can be connected and sealed by threading. One such need is for casing of sour gas wells. Another such need is for casing of geothermal wells. The basic need is for a tubular product having the strength and economy of steel, but having the corrosion resistance characteristics of nickel base alloy or other more expensive material. The cladding thickness for the full length of pipe is dictated by environmental concerns only and will generally be in the range of 0.070" to 0.120" thick. Downhole tubulars in a corrosive environment must be connected by threading and sealing. Thread geometries require a clad thickness far in excess of the thickness required for the balance of the tubular length. Cost, strength and design requirements prevent cladding the full length to the thicknesses required at the ends.

Mechanical stresses dictate that the cladding cylinders be metallically bonded to the tubular host. Such metallic bonds neither affect nor influence corrosion mechanisms. In order to achieve a metallic bond, two metals having very clean surfaces are placed in intimate contact with each other and subjected to a combination of temperature and pressure with cleanliness maintained during this step. In order to affect this metallic bond at low pressures and through a range of temperatures and pressures a third metal, a diffusion activator, is employed.

The present invention provides a method of using liquid interface diffusion bonding to clad a tubular product and, particularly, to clad the ends of a previously clad tubular with the geometries as required by thread and seal design. A clad tubular made by an expanding mandrel could concurrently be clad at the ends with the necessary geometries. Therefore, such a product will not be described in this disclosure. Clad seamless tubulars made by the methods herein of necessity are made with a uniform thin wall cladding.

Some thread designs incorporate a separate coupling. These tubulars have male threads, identical at both ends. Other thread designs (integral threads) require a thicker wall at the two ends for incorporation of a male thread (pin) at one end and female thread (box) at the other end. Such thicker ends are produced by upset forging the locally heated end by means of special dies mounted onto a hydraulic or mechanical press. Heating is achieved by induction coils or a slot furnace.

The thread designer for maximum economy may choose to clad only the inside seal surfaces. For greater reliability the thread designer may choose to clad the threaded portions and any outside seal as well. This invention suits any selection. The end cladding will take place subsequent to end upset and prior to such finishing operations as stress relieving, heat treating, quenching, straightening. End clad materials can and sometimes will be selected for heat treating by precipitation hardening during the heat treating cycle of the tubular host by quench and temper. This invention will be described as it applies to the box end of an integral thread with cladding extending from an inside seal through the thread to an outside seal.

In the practice of this invention the tubular host is bored and faced after upset. A cladding cylinder is turned and faced, and plated on all faying surfaces with an activator by electroless deposition. The cladding cylinder is assembled into the tubular host and lightly tack welded into place. A short tooling mandrel is assembled as a close fit into the subassembly. The tooling mandrel is made of an alloy such as 304 stainless steel or haynes alloy #188 so that the mandrel will have a coefficient of thermal expansion 25-50% greater than that of the host.

A heating and housing set-up is provided. The heating method is by induction coil. The housing is preferably made of plexiglass for full visibility of the process. Gaskets are used at the open end into which the subassembly is inserted. A general, but not perfect seal is all that is required. The space within the housing is pumped down to a vacuum such as $10^{-2}$ Torr and the housing back filled with argon. The operation can be repeated in order to achieve an atmosphere purity wherein the water and oxygen dew point is about $-60°$ F. An argon source is connected to the housing interior throughout the succeeding procedures, with the pressure maintained slightly above atmospheric. In this manner, all gas leaks will be out of the system and the purity of the atmosphere within the housing is maintained.

The subassembly is heated by means of an induction coil to 1650°-2100° F. The activator will be melted and the mandrel will expand greater than the tubular host. A metallic bond will be achieved between the tubular host and cladding cylinder. The maximum pressure is limited by the yield strength at temperature of the tubular host. If a higher pressure is desired, it can be achieved by incorporating a second hollow mandrel on the OD. This second mandrel would preferably be made of molybdenum so as to incorporate a coefficient of thermal expansion less than the tubular host. Assembly gaps can be designed to minimize, or avoid, plastic deformation of the tooling mandrels.

A foil (typically 0.002" thick) of stainless steel placed between the mandrel and the subassembly prevents bonding of the mandrel to the subassembly. This foil, which will be partially bonded to the subassembly, will be eliminated during subsequent machining as a part of threading.

A better understanding of the invention will be had by reference to the following description of the preferred embodiment, taken with the attached drawings, and the claims.

DESCRIPTION OF THE DRAWINGS

FIG. 2 is a fragmentary cross-sectional view of the box end as prepared for induction heating and liquid interface diffusion bonding of the cladding cylinder to the tubular host.

DESCRIPTION OF THE PREFERRED EMBODIMENTS OF THE INVENTION

Figure 1:
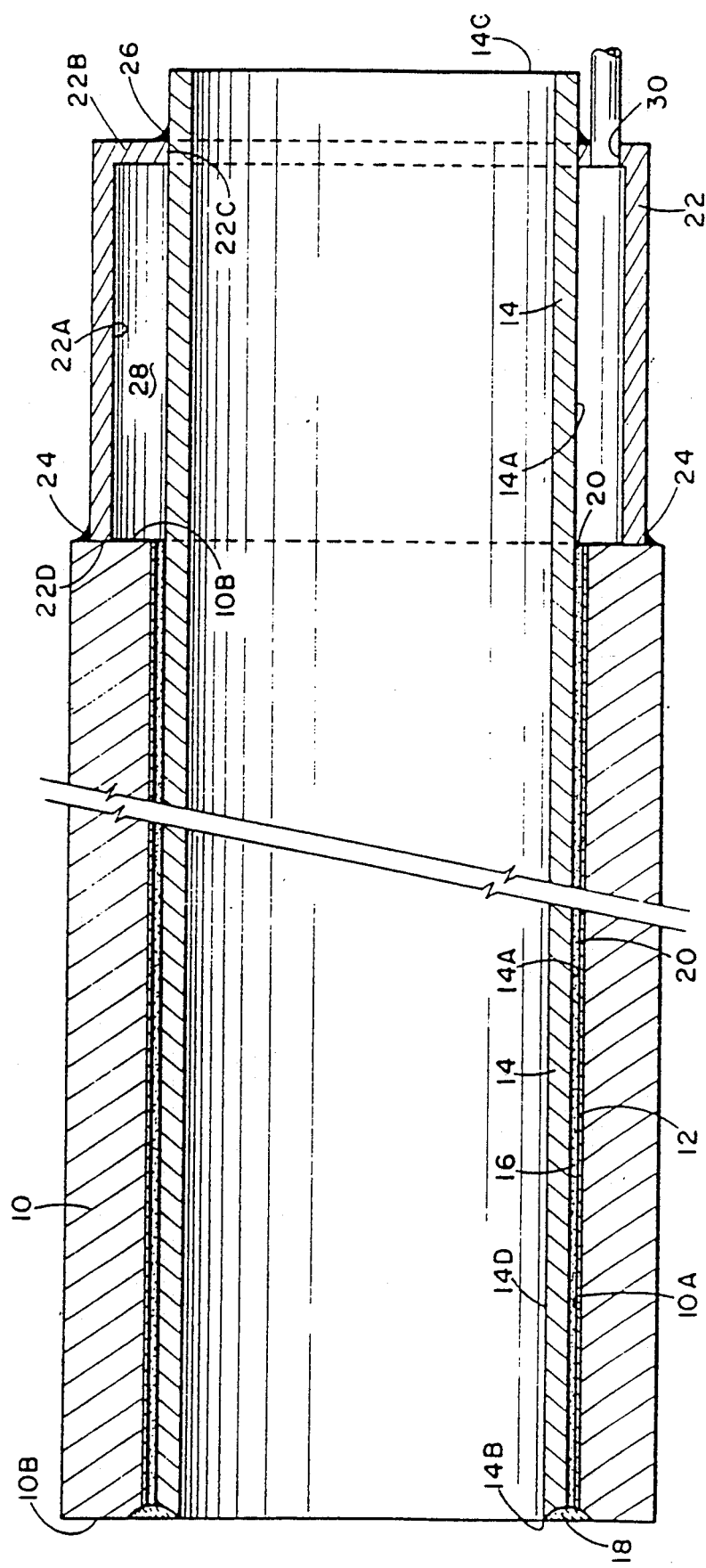
FIG. 1 is a fragmentary cross-sectional view of a subassembly as employed in the method of manufacturing internally clad tubular products showing the stage in the process in which the subassembly is ready to be heated and hot rolled in a mill.

This invention is directed to a method of internally cladding a tubular product, and particularly, a method of cladding the end of the internally clad tubular product in order to allow for internal threading. A method of internally cladding a tubular product will be first described.

While the invention may be practiced in other ways, it will be described as it is particularly applicable to the manufacture of internally clad tubular products in conjunction with the well known method of manufacturing seamless tubing in a mandrel mill. In a mandrel mill seamless tubing is manufactured by first producing by casting a solid cylindrical billet which is then heated in a rotary hearth furnace. The billet is then longitudinally pierced by a piercer to form a hollow shell. This hollow shell is rolled in a mandrel mill thus forming what is referred to as "mother" pipe. The mother pipe is, while still heated, formed to the required diameters by stretch reducing.

This method starts with the round billet after it has been pierced to produce a hollow shell which forms a tubular host. In some manufacturing processes the billet is "pierced" twice and in this case the hollow shell or host product will be employed after the second "piercing".

Referring to FIG. 1, the hollow tubular host is indicated by the numeral 10 and is typically formed of steel having the prescribed composition according to the ultimate intended use of the tubular product. The tubular host is of a diameter greater than the ultimate diameter of the tubular product and of length less than the ultimate length of the finished tubular product. In addition, the wall thickness is greater than will be found in the finished product.

The tubular host 10 is removed from the standard mandrel mill process and the internal surface 10A is plated with a layer of a low melting point bonding metal alloy 12. This is best achieved by submerging the tubular host 10 in a cleaning bath followed by an electroless plating bath.

The low melting point bonding metal alloy may be nickel phosphorus, nickel boron, nickel chromium phosphorus, chromium phosphorus or mixtures of these alloys. A preferred alloy is nickel phosphorus composed of about 88 to 98 per cent by weight nickel and about 2 to 12 per cent by weight phosphorus. In some instances, an additional wetting aid is helpful and in such cases about 0.5 to 1 per cent by weight boron may be employed in the plating alloy. The depth of the plating is not critical but may be to a thickness of about 0.0005 to about 0.002 inches. The exact composition will be determined by the hot rolling parameters.

A tubular cladding member 14 is next telescopically inserted into the plated host member 10. The tubing cladding member 14 has an external diameter 14A which is slightly less than the internal diameter 10A of the tubular host so that the cladding member slides freely into position within the host. In some instances it is desirable that a flux be employed, and if so, the flux will probably be applied to the external cylindrical surface 14A of the tubular cladding member. While other flux materials may be utilized a preferred material is cryolite.

The metallurgical terminology surfaces to be metallically joined are called "faying" surfaces. Thus, in the embodiment of this invention, as illustrated and described, the host cylindrical, internal surface 10A with the bonding metal alloy 12 plated thereon is one faying surface and the exterior surface 14A of the tubular cladding member, with or without a flux 16 thereon, is the other faying surface.

After insertion of the tubular cladding member 14 the first end 14B is welded to the host member 10 adjacent its first end 10B. The welding 18 is around the full circumference of the cladding member 14 and the host member 10B to form an airtight seal. The welding 18 does not have to be accomplished exactly at the end of the cladding member 14, that is, the cladding member 14 would probably extend somewhat beyond the end 10B of the host member. The essence of the welding step is to seal one end of an annular space 20 between the internal surface 10A of the host member and the exterior 14A of the cladding member, which annular space is closed at the other end by welding so as to incorporate the gas reservoir and seal the faying surfaces. The weld at the first end will also be structural and will transfer stresses between the two cylinders during rolling.

The next step is to remove from the annular space 20 water vapor and oxygen. This is achieved by first applying a vacuum to the annular space 20. One means of providing closed communication with the annular space is by the use of the circumferential bag 22. While the element 22 is referred to as "bag" or reservoir it is preferably of metallic material of an internal diameter at least equal to the internal diameter 10A of the tubular host. Bag 22 has a portion 22A. With the bag 22 in place a weld 24 is applied around the entire circumferential end 22D of the bag to seal it to the second end 10C of the host. A second weld 26 is then circumferentially applied to affix the bag to the external surface 14A of the cladding member. With the bag 22 thus welded in place closed communication is provided between the annular space 28 within the bag and the annular space 20 between the tubular host and the tubular cladding member.

A small diameter opening 30, which could be a pinch tube, is formed in bag 22 by which piping (not shown) may be attached.

By means of piping (not shown) the annular spaces 20 and 28 are subjected first to a vacuum to pull air from between the interior surface 10A of the host member and the exterior surface 14A of the cladding member.

Next, an inert gas, such as argon, is injected through the opening 30 to enter in and fill the annular space 20.

It is imperative that the annular space 20 between the interior surface of the host pipe and the exterior surface of the cladding member be substantially free of water and oxygen. By "substantially free" is meant that the space should be under conditions such that the water and oxygen dew point is at $-60°$ F. or below. To achieve this result the space may have to be evacuated, filled with inert gas, evacuated and refilled several times. When the water and oxygen levels in the annular space have been reduced to the accepted level the pressure of inert gas remaining in the annular space can be relatively low and preferably is that which is sufficient to help support the bag, that is, resist collapsing of the bag, during the subsequent steps of heating and rolling the subassembly. At this step, a quantity, such as 5 wt. percent hydrogen may be added to the inert gas.

The host member with its inserted tubular cladding member 14 welded at 18 and with the bag 22 in position and welded at 24 and 26 forms a subassembly. After evacuation and filling the annular space 20 with an inert gas as above described, the subassembly is ready for the final stages of forming a cladded tubular member. The subassembly may now be returned to the mill and succeeding steps are employed as with a pierced billet completing the manufacture of a seamless tubular item. The subassembly is heated to a temperature at which bonding under pressure effectively occurs.

The essence of this invention is the application of liquid interface diffusion bonding to achieve metallic bonding of tubular products within the customary practices of hot rolling. LIDB requires temperatures above 1650° F., some contact pressure, and very clean conditions. The nickel base alloy can not be exposed to air above 2200° F. For this reason, the subassembly is heated to a temperature at which the bonding metal alloy 12 melts, which is in the range of about 1650° F. to 2100° F. When the bonding metal alloy is nickel phosphorus, the subassembly is heated to about 1950° F.

In the exemplary application of the invention wherein a cladded pipe is manufactured on a mandrel mill, a mandrel is inserted into the heated subassembly and pressure is applied between the tubular cladding member 14 and host member 10 to metallically bond the two materials together; that is, after the subassembly is heated to the required temperature. It is hot rolled by a bank of opposing rolls to metallically bond the cladding member 14 to the host member internal surface 10A. The host member is now internally clad. Thereafter, the clad tubular member is passed through the normal steps employed in manufacturing seamless pipe on a mandrel mill; that is, stretch reduced to provide the preselected internal and external diameters and lengths. After which the clad pipe is cut to length, straightened, inspected, heat treated and so forth.

The use of bag 22 greatly facilitates the practice of important steps in the invention; that is, the bag makes it easy to remove oxygen and water from the annular space 20 and to prevent the reintroduction of such contaminants during heating in a non-atmosphere controlled furnace and during rolling. Additionally, the bag will expand during rolling in such a manner as to accept all gases being displaced from between the faying surfaces. After the cladding step has been completed, portions of the tubular cladding member 14 extending beyond the ends of the tubular host, and the bag 22, will be cut off and discarded. Thus, the bag 22 will be used only one time. Bag 22 does not need to have the shape illustrated. It may be arcuate in cross-sectional configuration, or it may be of a truncated conical shape. All that is necessary is an apparatus suitable to the tasks already listed.

Rolling equipment such as a reeler may readily be substituted for the mandrel mill. The exact equipment selected will be at the convenience of the steel mill. For very large diameter sizes, it is anticipated that a close fitting mandrel, made of a metal possessing a much higher coefficient of thermal expansion than the host, a metal such as stainless steel, can be used to clad with no recourse to rolling. The trade-off would be only a matter of economics and all selections would require the essence of the invention.

After the internally clad pipe is completed, the gas bag 22 is removed and the cladding cylinder 14 cut off even with the end of the pipe, or the entire internally clad pipe is cut into lengths. In order to modify the end of the pipe to accept the threaded male or pin end of another length of pipe, the pipe end must be enlarged, or upset, a standard forging procedure. The enlarged diameter, integral end of internally clad pipe 10 is indicated by the numeral 32 FIG. 2. The upset end is machined after forging, providing three faying surfaces 32A, 32B and 32C.

A cladding cylinder 34 is turned to the geometry shown and faced on the three faying surfaces 34A, 34B and 34C. The three surfaces are plated with a low melting point, bonding metal alloy as previously described. The cladding cylinder is assembled into the tubular host and held in place, such as by light tack welding.

The upset end 32 of the tubular host, or pipe 10, thus has three faying surfaces 32A, 32B and 32C matched by the three faying surfaces 34A, 34B and 34C of the cladding cylinder 34, with bonding metal alloy 36 therebetween. A flux may be used as previously described.

A reusable expanding cylindrical mandrel 38 is assembled into position within cladding cylinder 34. Throwaway foils 40A and 40B can be used if necessary to assure no brazing of the mandrel to the subassembly occurs due to flow of excess bonding metal. The reusable mandrel 38 is made of metal possessing a greater coefficient of thermal expansion than tubular host 10. It is preferably hollow, for convenience in handling and heating.

The cladding cylinder 34, having the bonding metal alloy 36 thereon, together with tubular host 10 and the mandrel 38, positioned within the pipe upset end 32, form a subassembly.

A cylindrical plug 42, which may be made of non-heat conducting material, such as alumina, is positioned within pipe 10. An induction coil 44 is positioned about the subassembly, and the subassembly and induction coil are then enclosed with a housing 46. The housing includes a split ring 48 which is positioned about the exterior of pipe 10. The housing is preferably made with a first end plate 44A which fits over the split ring 48 and a detachable end plate 44B, overnst the split ring 48. All tooling elements are, like mandrel 38, reused in the practice of the process.

Housing 46 is penetrated by a gas line 50 which is used at first to vacuum down the enclosure. It is then used to back fill the enclosure with argon in the same manner as the gas bag of FIG. 1 is evacuated and then filled with an inert gas to achieve the pure atmosphere of −60° F. dew point required for liquid interface diffusion bonding. This purity is preserved throughout the heating and bonding cycle by maintaining a pressure within the housing slightly greater than atmosphere, a differential such as 0.2–0.5 PSI. Thus, if leakage occurs it will mean only the loss of inert gas, and will not affect the process. Gasketing will be used as appropriate.

The subassembly is heated by means of the induction coil 44 to 1650°–2100° F. The alloy 36 is melted. Fitups gaps are eliminated and bonding pressure is attained by the expansion of mandrel 38. Liquid interface diffusion bonding is achieved in the same way as previously described with reference to FIG. 1.

After the subassembly has been raised to the temperature prescribed to bond the cladding cylinder 34 to the upset end 32 of tubular host pipe 10, and lowered to approximately room temperature the subassembly is removed from housing 46 subsequent to disassembly of split ring 48. The upset end of the pipe is then ready for internal threading, the threads and seals being made in the cladding cylinder 34. In this manner, all the interior surfaces of the tubular host 10, including the internally threaded upset end 32 and end 32C, are formed of an alloy, preventing liquids or gases flowing in the pipe from contacting the tubular host itself.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of internally cladding a tubular product, an enlarged diameter upset end portion comprising:
   (a) positioning a tubular cladding member within the upset end portion of the tubular product, the cladding member having a plating of low melting point bonding metal alloy on the external tubular surface thereof;
   (b) positioning a cylindrical mandrel within said tubular cladding member, the mandrel having a coefficient of thermal expansion greater than said tubular product upset end,;
   (c) positioning an induction coil around the tubular product upset end;
   (d) sequentially evacuating the space between the exterior of said cladding member and the interior of said upset end of said tubular product and charging it with an inert gas, the sequence being carried on to substantially remove all the water and oxygen and leave the space filled with inert gas with the level of water and oxygen being below a dew point of about −60°;
   (e) heating said tubular product upset end, said cladding member and said mandrel to about 1,650° F. to 2,100° F. to metallically bond said cladding member to said tubular product upset end.

2. A method according to claim 1 including after step (c) positioning a housing around said tubular product upset end, the housing providing means to facilitate the performance of step (d).

3. A method according to claim 1 including, prior to step (d), plugging the interior of said tubular product.

4. The method according to claim 1 wherein step (d) includes repeatedly charging the evacuated annular space with argon.

5. The method according to claim 1 wherein in step (a) said low melting point bonding metal alloy is nickel-phosphorus composed of about 88 to 98 per cent by weight nickel and about 2 to 12 per cent by weight phosphorus.

6. The method according to claim 1 wherein step (a) includes submerging the cladding member in an electroless bath.

7. The method according to claim 1 including the step of coating the exterior of the cladding member with a flux prior to positioning it within the upset end of said tubular product.

8. The method according to claim 7 wherein the flux is composed essentially of cryolite.

9. The method according to claim 1 wherein in step (a) the low melting point bonding metal alloy is composed of about 88 to 98 per cent by weight nickel, about 2 to 12 percent by weight phosphorus and about 0.5 to 1 per cent by weight boron.

10. The method according to claim 1 wherein in step (e) the subassembly is heated to about 1925° F.

11. The method according to claim 1 wherein in step (a) the external surface at said tubular cladding member is plated with a low melting poiint bonding metal alloy selected from the group comprising nickel phosphorus, nickel boron, nickel chromium phosphorus, chromium phosphorus and mixtures thereof.

* * * * *